(12) United States Patent
Pennington et al.

(10) Patent No.: US 6,255,592 B1
(45) Date of Patent: Jul. 3, 2001

(54) FLEXIBLE ARMORED COMMUNICATION CABLE AND METHOD OF MANUFACTURE

(75) Inventors: Barry Pennington, Cleveland; Doug Askins, San Antonio, both of TX (US)

(73) Assignee: Gamut Technology, Inc., Willis, TX (US)

( * ) Notice: Subject to any disclaimer, the term of this patent is extended or adjusted under 35 U.S.C. 154(b) by 0 days.

(21) Appl. No.: 09/301,986

(22) Filed: Apr. 29, 1999

Related U.S. Application Data

(60) Provisional application No. 60/084,169, filed on May 4, 1998, now abandoned.

(51) Int. Cl.[7] .................................................. H01B 7/22
(52) U.S. Cl. ............................................................ 174/103
(58) Field of Search ........................... 174/102 R, 103, 174/105 R, 106 R, 108

(56) References Cited

U.S. PATENT DOCUMENTS

| | | | |
|---|---|---|---|
| 34,862 * | 1/1862 | Morgan et al. | 174/102 R X |
| 265,026 | 9/1882 | Coultaus . | |
| 318,457 | 5/1885 | Durkee . | |
| 357,489 | 2/1887 | MacDuff . | |
| 608,911 | 8/1898 | Reed . | |
| 609,570 | 8/1898 | Bowden . | |
| 630,502 | 8/1899 | Greenfield . | |
| 787,904 | 4/1905 | Dring . | |
| 809,561 | 1/1906 | Greenfield . | |
| 838,179 | 12/1906 | Greenfield . | |
| 1,573,933 | 2/1926 | Guest . | |
| 1,756,274 | 4/1930 | Anderegg . | |
| 1,793,487 | 2/1931 | Johnson . | |
| 1,940,145 | 12/1933 | Raiche | 154/8 |
| 1,966,516 | 7/1934 | Phillips | 113/35 |
| 1,990,514 | 2/1935 | Angell | 117/17 |
| 1,995,866 | 3/1935 | Schneider | 113/35 |
| 2,012,126 | 8/1935 | Gilbert | 173/266 |
| 2,106,060 | 1/1938 | Ostrander | 173/267 |
| 2,181,475 | 11/1939 | Bourdon | 245/1.5 |
| 2,209,114 | 7/1940 | Dörr | 153/66 |
| 2,255,108 | 9/1941 | Fischer | 57/13 |
| 2,337,556 | 12/1943 | Hosking | 174/102 |
| 2,342,343 | 2/1944 | Hotchkiss, Jr. | 57/1 |
| 2,375,067 * | 5/1945 | Bennett | 174/102 R |
| 2,399,419 | 4/1946 | Wright | 57/59 |
| 2,444,001 | 6/1948 | Arens | 57/13 |
| 2,738,641 | 3/1956 | Slavek | 57/12 |
| 2,841,201 | 7/1958 | Cheatle | 153/66 |
| 3,180,365 | 4/1965 | Peterson | 138/134 |
| 3,231,665 | 1/1966 | Grimes, Jr. et al. | 174/108 |
| 3,259,675 | 7/1966 | Bowers | 264/103 |
| 3,365,538 | 1/1968 | Voigt | 174/128 |
| 3,368,268 | 2/1968 | Sherman | 29/203 |
| 3,445,072 | 5/1969 | Koppisch | 81/6 |
| 3,477,474 * | 11/1969 | Mesler | 174/102 R X |
| 3,679,812 * | 7/1972 | Owens | 174/108 |
| 3,681,514 | 8/1972 | Rhoades et al. | 174/108 |
| 3,756,004 | 9/1973 | Gore | 57/11 |

(List continued on next page.)

FOREIGN PATENT DOCUMENTS

| | | | |
|---|---|---|---|
| 1805781 | 5/1970 | (DE) | 163/156 |
| 835177 | 8/1937 | (FR) . | |
| 861774 | 11/1940 | (FR) . | |
| 2-129815 | 5/1990 | (JP) | 156/56 |

Primary Examiner—Kristine Kincaid
Assistant Examiner—Chau N. Nguyen
(74) Attorney, Agent, or Firm—Jenkens & Gilchrist, A Professional Corporation

(57) ABSTRACT

An armored flexible communication cable includes a central core member. Armor wire is formed into spaced apart coils and wrapped around the central core member to affix the position of the elongated central core member with respect to the wrapped outer armor and to provide crush protection for the central core member.

14 Claims, 11 Drawing Sheets

U.S. PATENT DOCUMENTS

| | | | |
|---|---|---|---|
| 3,773,109 | 11/1973 | Eberline | 166/54.5 |
| 3,855,468 | 12/1974 | Pitts, Jr. | 250/262 |
| 3,873,396 | 3/1975 | Rice | 156/392 |
| 3,890,181 | 6/1975 | Stent | 156/143 |
| 4,028,660 | 6/1977 | Pitts, Jr. | 340/18 |
| 4,077,022 | 2/1978 | Pitts, Jr. | 333/1 |
| 4,165,765 | 8/1979 | Gilbu et al. | 138/174 |
| 4,211,595 | 7/1980 | Samour | 156/187 |
| 4,368,613 | 1/1983 | Sanchez | 57/11 |
| 4,440,974 | 4/1984 | Naudet | 174/108 |
| 4,585,287 | 4/1986 | Ramsey | 339/60 |
| 4,621,777 | 11/1986 | O'Connor | 242/1 |
| 4,641,492 | 2/1987 | Glushko et al. | 57/9 |
| 4,663,928 | 5/1987 | Delobel et al. | 57/264 |
| 4,719,320 | 1/1988 | Strait, Jr. | 174/106 R |
| 4,721,355 | 1/1988 | Gould | 350/96.2 |
| 4,738,734 | 4/1988 | Ziemek | 156/53 |
| 4,898,046 | 2/1990 | Mancewicz | 74/502.5 |
| 5,061,823 * | 10/1991 | Carroll | 174/105 R |
| 5,150,443 | 9/1992 | Wijnberg | 385/107 |
| 5,212,350 | 5/1993 | Gebs | 174/102 R |
| 5,230,033 | 7/1993 | Soodak | 385/105 |
| 5,543,715 | 8/1996 | Singer et al. | 324/368 |

* cited by examiner

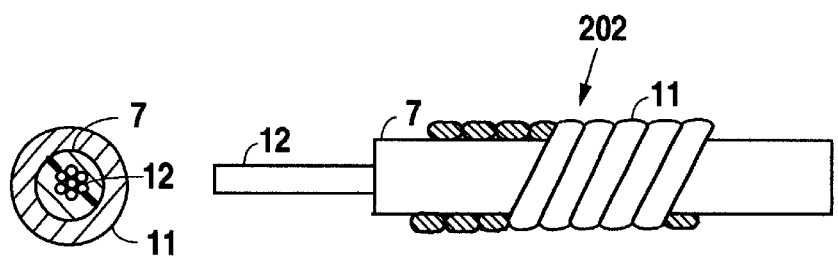
Fig. 2A   Fig. 2
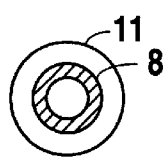 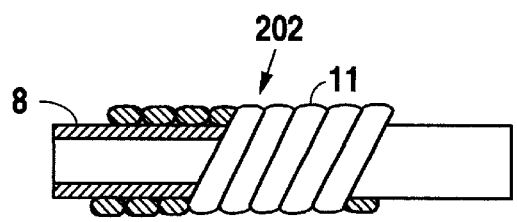
Fig. 3A   Fig. 3
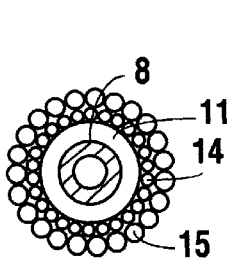 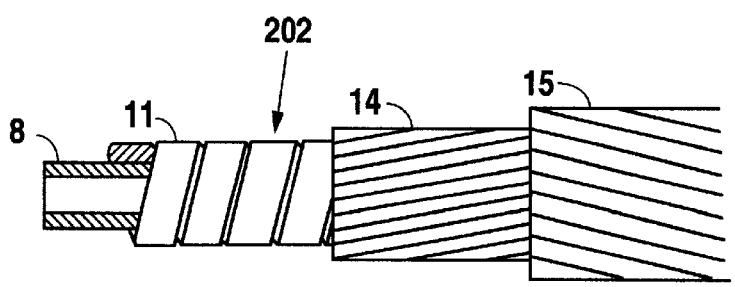
Fig. 4A   Fig. 4
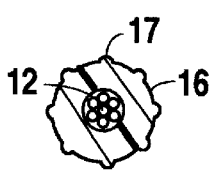 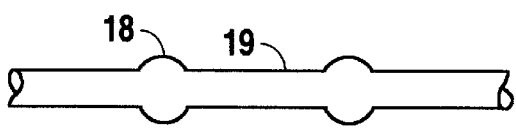
Fig. 5   Fig. 5A

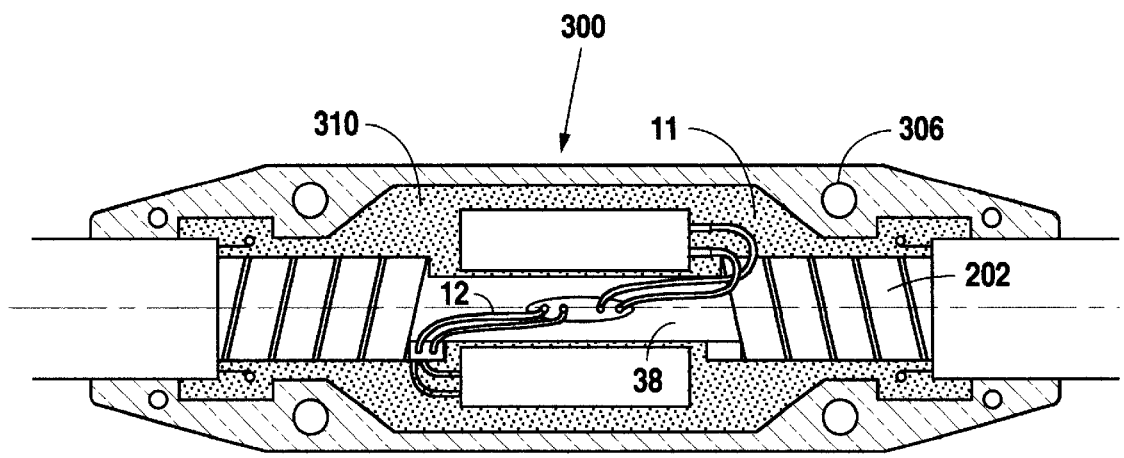
Fig. 16
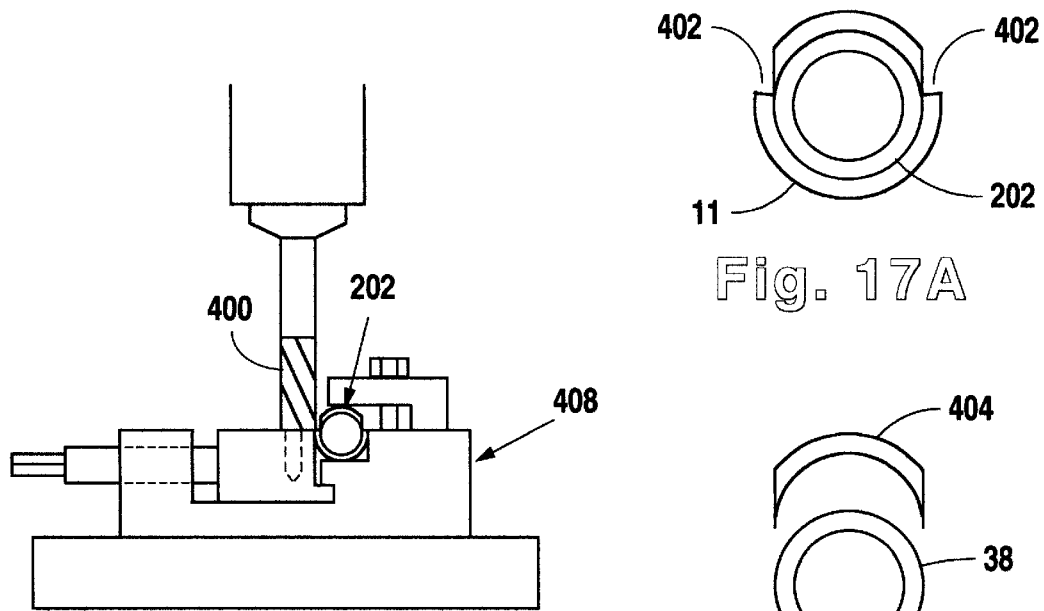
Fig. 17
Fig. 17A
Fig. 17B

FLEXIBLE ARMORED COMMUNICATION CABLE AND METHOD OF MANUFACTURE

This application claims the benefit of U.S. Provisional Patent Application Ser. No. 60/084,169 filed May 4, 1998 now abandoned.

FIELD

The present invention relates to protected non-load bearing communication cable. More particularly, the present invention relates to long, flexible, armored communication cable for use in oil wells or other hostile environments.

BACKGROUND

In recent years, owners of oils and gas wells have learned that it is more economical to maximize the production of hydrocarbons from proven reserves than to drill new wells looking for previously undiscovered reservoirs. Specifically, it has been found in many wells that less than 50% of the hydrocarbons contained in existing proven oil or gas reservoirs are actually brought to the earth's surface.

To learn more about the underground reservoirs of oil and/or gas, for the purpose of obtaining greater oil and/or gas production, it is necessary to place sophisticated instrumentation or gauges into previously drilled or newly drilled wells. Such sophisticated instrumentation includes, but is not limited to, geophones or geometers, fiber optics, video cameras, sniffers, pressure sensors, liquid level sensors, thermometers and radiation measuring equipment.

To be able to make use of the information provided by the sophisticated instrumentation or gauges within a well, there is a need to connect the instrumentation or gauges to a recording apparatus at the top of the well.

In still other wells, electrically operated equipment such as valves or small motors are placed deep within the well bore. Reliable operation of such equipment requires communication with control apparatus at the top of the well.

Because most proven wells include a production tubing string within the casing lining the well, the communication cable connecting the sophisticated instrumentation, gauges, or electrically operated equipment to the recording or control apparatus at the top of the well is required to be positioned in the annulus between the production tubing string and the casing or between the casing and the earthen wall of the drilled hole. To assure the integrity of the communication cable it is necessary that the communication cable connecting the down-hole instrumentation or gauges, or electrically operated equipment to the recording or control apparatus at the top of the well be protected from damage by impact forces. In addition, it is necessary that the communication cable be available in long lengths as the worldwide average well depth is about 6,000 feet. Further, 25% of the oil or gas wells worldwide have a depth which is greater than 12,000 feet, and 15% of the world's oil and gas wells have a depth which is greater than 20,000 feet.

To satisfy the need for long lengths of flexible, crush resistant communication cable for connecting sophisticated instrumentation for sensing physical parameters within a well to recording equipment on the earth's surface, owners of wells have looked to various types of protected communication cables.

One type of protected communication cable considered for downhole use was the armored electrical cable used in both commercial and residential construction. This cable is often referred to as BX or Greenfield cable. The origination of BX cable can be traced back to the early U.S. patents to Greenfield—U.S. Pat. Nos. 630,502; 809,561 and 838,179. Most BX cable includes interlocking layers of sheet metal strips wrapped around electrical wires. While inexpensive and readily available, BX cable does not provide the crush resistance needed in oil wells or in hostile environments.

Another type of protected communication cable suitable for downhole use is a product referred to as "tube wire." Tube wire is often used to convey readings from a pressure sensor at the bottom of a well to the earth's surface. The process steps illustrated in FIG. 1 are used to make tube wire. Specifically, the ends 502 of a metal jacket or sheath 500 are butt welded 504 together in the same way paper is wrapped around tobacco in a cigarette. The welded jacket is then swaged around the inner wire 506. Because of its construction, tube wire is rigid and not easily passed over small diameter pulleys or around small diameter guide blocks. In addition, frequent bending of tube wire cold works the metal jacket 500 thus increasing the rigidity of the product. Users of tube wire often experience significant problems in connecting sections of tube wire together and repairing broken sections of tube wire. Because tube wires often operate in high pressure environments, pockets of high pressure may become trapped between the inner wire 506 and the outer sheath 500 which causes the outer sheath 500 to expand to where the butt weld 504 will fail. Even though the metal tube 500 is swaged over the inner wire 506, the inner wire 506 can move longitudinally with respect to the outer sheath 500. This longitudinal movement of the inner wire 506 has actually caused the inner wire 506 to disconnect from pressure gauges at the bottom of the well. Finally, tube wire requires complex payout equipment to enable its utilization at an oil or gas well. Shown in FIG. 1A is an alternate embodiment 510 of prior art tube wire. In embodiment 510 the insulation 508 around the wire 506 has three ribs 509 which create three spaces 511 when the outer jacket 500 is swaged around the wire 506. These three spaces may be filled with epoxy or other similar material to prevent the entrapment of pressurized gas.

Yet another type of communication cable often found in oil fields is referred to as double-wound tension bearing cable. Such cables are described in U.S. Pat. Nos. 4,028,660; 4,077,022; 4,440,974; and 5,150,443. While double wound tension bearing cable is satisfactory for limited applications in shallow wells, it has been found that double wound, tension bearing cables are too inflexible and too expensive to be used in deep wells to assure communication with down-hole instrumentation gauges, or electrically operated equipment. In addition, double wound, tension bearing cable has little crush resistance and also exhibits a tendency to unwind when used in deep wells because the great weight of long lengths of hanging cable causes the outer covering to unwrap.

While cables of all shapes and sizes have been made for many years, none of the available cables met the needs of being crush resistant, manufacturable in exceedingly long lengths, able to hold an inner core of wires in position, continuously flexible, reusable, not requiring complex pay-out equipment to enable use, and inexpensive.

Accordingly, the inventors herein have looked to cable designs not typically used in oil wells for communication with sophisticated instrumentation or gauges. Such cables are often referred to as Bowden cables and were originally described in U.S. Pat. No. 609,570. Bowden cables are typically relatively small cables that are commonly used for push-pull force applications which require a central control wire within a coiled compression-bearing wire encasement to enable the remote application of either a push force or a pull force.

Generally, a Bowden cable is produced by spirally winding a wire at the desired lay angle (more than 45 degrees) about a central wire. Once the Bowden cable is formed, it is typically cut off in short lengths. The length of a single continuous Bowden cable that can be produced is limited by manufacturing constraints. Further, the Bowden cable must be produced in a straight condition and not coiled on a take-up reel because a take-up coiling reel would have to be rotated about a transverse axis while coiling the Bowden cable to avoid twisting the cable. If the Bowden cable were to provide the desired solution for a down-hole communication cable, the need remains to make a Bowden cable larger, crush resistant, manufacturable in exceedingly long lengths, able to firmly hold an inner core in position, able to be repeatedly flexed, reusable, easily dispensable without the use of complex payout equipment, and finally—inexpensive.

SUMMARY

The long, flexible, armored communication cable of the present invention is crush resistant, fly holds its inner core in position, is reusable, is inexpensive and is easily dispensed from a stationary container, such as a cardboard box. The preferred embodiment of the disclosed long, flex armored communication cable of the present invention includes a central core member encased in an outer jacket formed of flattened, heavy duty steel wire. The outer protective heavy duty steel wire encasement jacket is spirally wound about the central core member with a high lay angle to provide a crush proof, flexible outer encasement jacket which both encloses and firmly holds the central core member in position with respect to the outer coil of flattened, heavy duty steel wire.

The central core member of the long, flexible, armored communication cable can be a group of wires, one or more small tubes, fiber optic bundles or other commonly used communication systems.

Further, the present invention also includes the process and apparatus for manufacturing the long, flexible, armored communication cable of the present invention wherein one or more flattened, heavy duty steel wires are formed and, at the same time, are wrapped about the central core member at a high lay angle. The resulting long, flexible, armored communication cable is economical to manufacture in long lengths, easy to use, reuse, and maintain in a wide variety of hostile environments.

In generating the long, flexible, armored communication cable of the present invention, a central core member is guided between a payoff reel and a take-up reel by a payoff roller guide system and a take-up roller guide system. For larger diameter long, flexible, armored communication cables, the payoff roller guide system and the take up reel roller guide system are respectively mounted to rotate the central core member between the two roller guide systems about its own longitudinal axis while the central core member is also moving longitudinally between the two roller guide systems. The outer heavy duty steel wire encasement jacket is spirally applied to the longitudinally moving and rotating core member by tangentially and continuously supplying a flattened heavy duty wire to a coiling/wrapping point where the coiled flattened heavy duty outer armor wire is placed around the rotating and longitudinally moving central core member. Because the central core member is rotated while it is being covered by the flattened, heavy duty, armor wire, the length of armored communication cable is limited only by the lengths of the central core member and the amount of finished cable that can be accommodated by the reels used in the manufacturing process. For smaller diameter long, flexible, armored communication cable, the outer armor wire is coiled and wrapped around a non-rotating inner core member.

In the manufacturing apparatus of the present invention, the length of the central core member to be wrapped with flattened, heavy duty, armor wire has its central axis aligned with the central axes of rotating tubular spindles which are mounted both on a payoff stand and a take-up stand. The guide systems for the flattened, heavy duty, armor wire are rotated about the aligned central axes. During the manufacturing process, the central core member to be wrapped with flattened, heavy duty, armor wire is unwound from a supply payoff reel by a rotating flyer assembly on the payoff stand. For larger diameter armored cables, the central core member is then fed between tubular spindles mounted on the payoff stand and the take-up stand at a constant linear speed while rotating the central core member about its own longitudinal axis. For smaller diameter armored communication cables the central core member does not rotate.

The coiled, flattened, heavy duty, armor wire to be wrapped around the central core member is fed tangentially at a coiling point onto the longitudinally moving core member at a location between the payoff and take-up stands. Uncoiled, flattened armor wire is supplied to the coiling/wrapping point adjacent the central core member from a wire reel. The linear speed of the central core member defines the helix angle of the outer armor wire, the helix angle preferably being a high lay angle. The combination of the central core member and the applied coiled, heavy duty, flattened outer armor wire are pulled by a capstan unit on a rotating flyer on the take-up stand to a spool on a take-up reel.

DESCRIPTION OF THE DRAWINGS

A better understanding of the long, flexible, armored communication cable of the present invention and its method of manufacture may be had by reference to the following drawings wherein:

FIGS. 2 and 2A are a side view and an end view respectively, in partial cross section, of a first embodiment of the long, flexible, armored communication cable of the present invention;

FIGS. 3 and 3A are a side view and an end view respectively, in partial cross section, of a second embodiment of the long, flexible, armored communication cable;

FIGS. 4 and 4A are a side view and an end view respectively, in partial cross section, of a third embodiment of the long, flexible, armored communication cable;

FIG. 5 is a cross sectional view of an alternate embodiment of the central core member;

FIG. 5A is a front elevational view of an alternate embodiment of the central core member;

FIGS. 16 is a front elevational view, in partial cross section, of an instrument casing; and FIGS. 17, 17A, and 17B are process steps illustrating the removal of the outer armor wrap.

DESCRIPTION OF THE EMBODIMENTS

The Cable Itself

Figure 1:
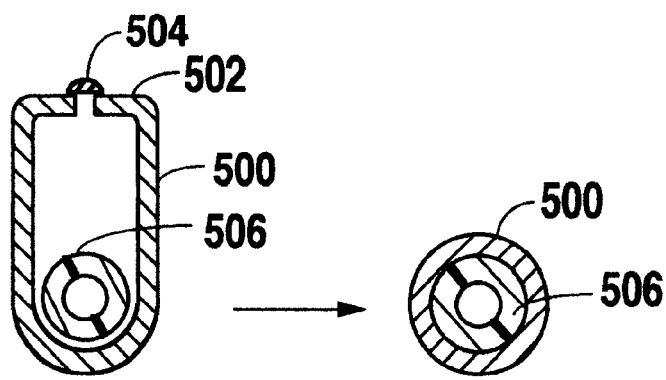
FIG. 1 is a cross-sectional view of the steps required to make prior art tube wire.
Figure 1A:
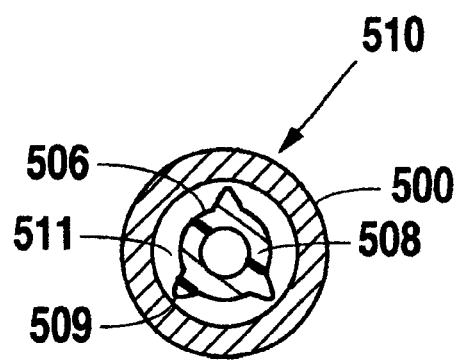
FIG. 1A is a cross-sectional view of an alternate embodiment of the prior art tube wire.

Referring now to FIGS. 2, 2A, 3, and 3A, a flexible, armored communication cable 202 is illustrated with a central core member 7 (plastic tube) or (insulated wire bundle) and a flattened, heavy duty, outer armor wire 11 wrapped around the central core member 7 or 8 at a high lay angle with respect to the center line of the product, the lay angle being from about 60° to nearly 90°. In FIGS. 2, and 2A the central core member 8 includes a bundle of insulated wires 12. In FIGS. 3 and 3A the central core member 7 is a plastic tube. The outer armor wire 11 shown has a preferred flattened, cross-section with sufficient side-by-side separation between the coils to allow the long, flexible, armored communication cable 202 of the present invention to be easily coiled. Other shapes of outer armor wire can be employed.

To obtain the required level of crush resistance, the outer armor wire must be heavy duty. It has been found that the ratio of the finished diameter of the long, flexible, armored communication cable to the flat-to-flat thickness of the coiled wire should be in the range of about 4:1 to about 11:1. Best results have been obtained when this ratio is 6.15:1. While a variety of different materials may be used for the outer armor wire, more particularly medium to high carbon steels provide the best properties at the lowest cost. If desired stainless steel, nickel, titanium, hastelloy, composites or a wide variety of other materials can also be used. To assure that the central core member is firmly gripped by the coil of flattened, heavy duty armor wire, there is an interference fit between the inside diameter of the coiled, flattened, heavy duty, outer armor wire 11 and the outside diameter of the central core member. Alternatively, a ding or indentation 9 (FIG. 3B) may be made in the outer armor wire 11 at predetermined intervals to physically engage the outer surface of the central core member to prevent the central core member from moving with respect to the outer wrapped armor wire. In addition, those of ordinary skill in the art will also understand that a glue or epoxy may be applied, at predetermined intervals, between the inside of the outer armor wire and the outside of the central core member.

As shown in FIGS. 4 and 4A, the long, flexible, armored communication cable 202 of the present invention may be enclosed in additional layers of armor wire 14, 15 if required for specialty applications.

As shown in FIG. 5, an alternative central core member 16 may include a plurality of ribs 17 into which the interference fit of the coiled armor wire 11 may occur. Alternatively, as shown in FIG. 5A, yet another alternate central core member 19 may include a plurality of bumps 18 into which the interference fit of the coiled armor wire may also occur.

Splicing

Figure 18:
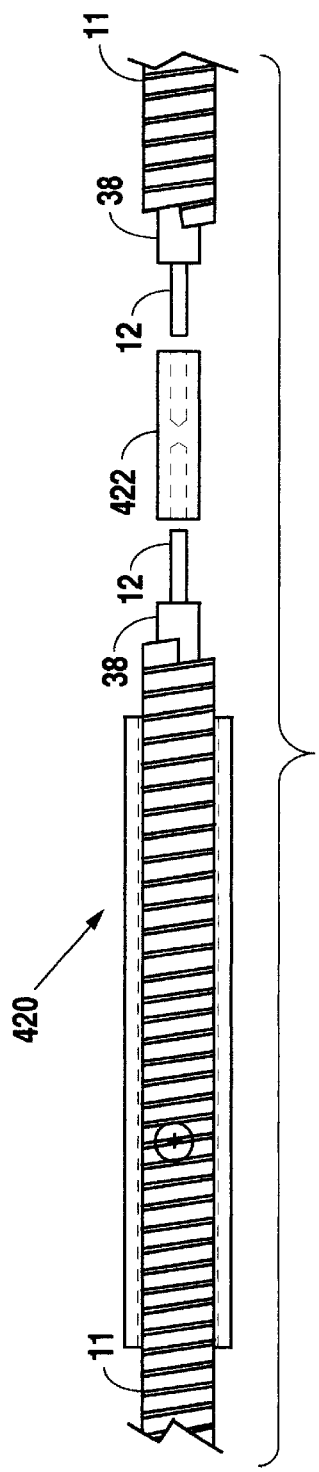
FIGS. 18, 18A and 18B are the process steps used in splicing together sections of the long, flexible armored communication cable.
Figure 18A:
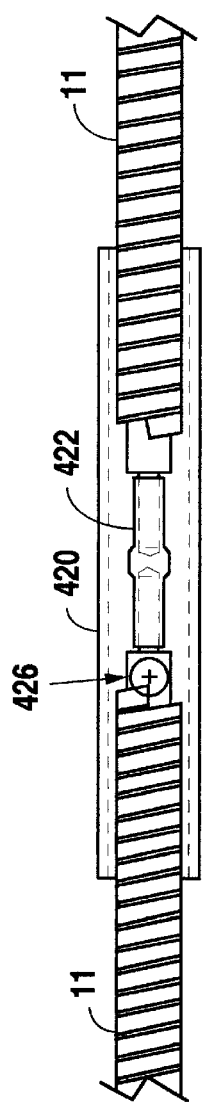
Figure 18B:
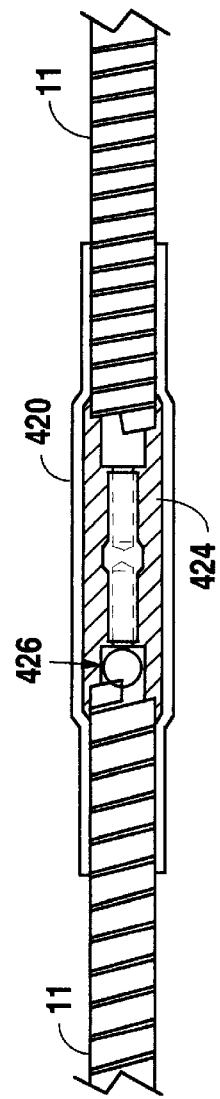

As shown in FIGS. 18, 18A and 18B, it is also possible to splice together sections of the long, flexible armored communication cable of the present invention. In FIG. 18 a swage tube 420 is placed over one end of the sections of armored cable to be joined. Joining together the wires 12 within the central core member 38 are one or more swage connectors 422. After the one or more swage connectors have been crimped or clamped onto the wires within the central core member 38, the swage tube 420 is slid along the armor wire 11 to a position over the swage connector 422, as shown in FIG. 18B where it is swaged over the armor wire 11. Insulation 424 may then be inserted into the swage tube 420 through a hole 426 in the swage tube.

A variety of different mechanical means may be used for splicing together ends of the long, flexible armored cable. For example, field splices of cable sections have been made by using a split collet over which a collar is moved to cause the fingers of the split collet to clamp down on the outside of the cable. Such collet and collar arrangements may be used when apparatus is not readily available to perform the crimping or clamping shown in FIGS. 18, 18A and 18B.

Connectors

Figure 6:
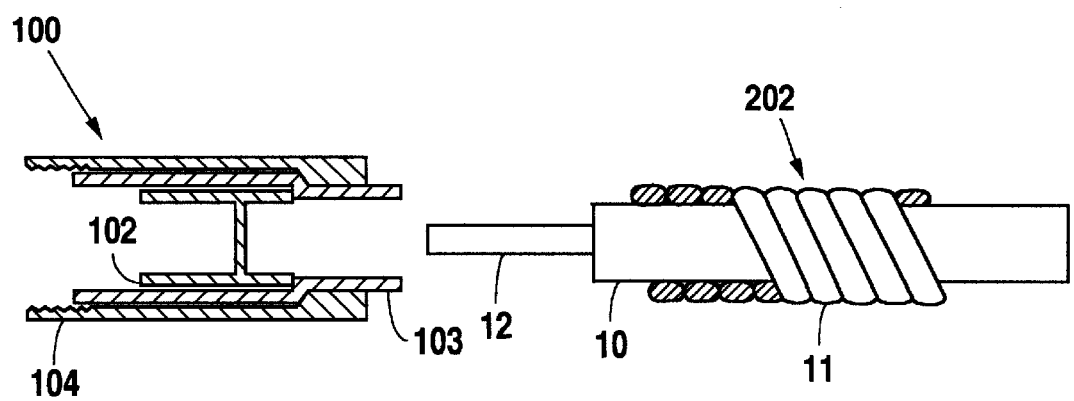
FIG. 6 is a cross sectional exploded view of a long, flexible, armored communication cable connection.
Figure 7:
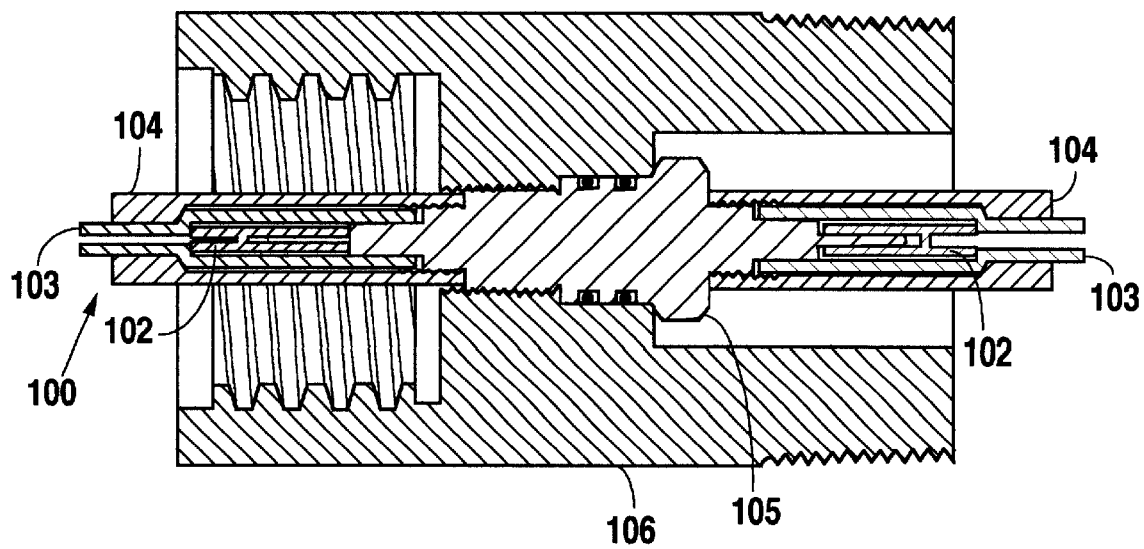
FIG. 7 is a cross sectional view of multiple connectors within a bulkhead adapter plug.

As shown in FIG. 6, connection to the central core member, for example, the insulated wire bundle of the long, flexible, armored communication cable 202 of the present invention is facilitated by the use of commonly available connectors 100 that have some minor modifications. Specifically, a connector 100 is chosen having a crimp contact 102 of sufficient size so that the soft rubber boot 103 at the end of the connector 100 will fit snugly around the central core member 8. In high pressure environments such as may be encountered in a well, the tightness of the fit between the boot 103 at the end of the connector 100 and the exterior of the central core member 8 will increase because of the higher ambient pressure. Surrounding the connector 100 is a retaining sleeve 104 that can be made of a flexible insulating material. As shown in FIG. 7 such connector arrangements may be used for connection to similar connectors 100 using a commonly available feed-thru type connector 105 which can be mounted in a bulkhead adapter 106.

Manufacturing Process and Machinery

As shown in FIGS. 8, 8A, 8B, 9, and 10, the central core member 38 passes over guide rolls 22a, 22b of a guide roll system after exiting the payoff reel 20. These guide rolls 22a and 22b align the longitudinal axis of the central core member 38 with the axis of the payoff reel 20. The central core member 38 is then passed through an armor wire coiling/wrapping point 30. The central core member 38 then moves through the tension sensor assembly 32 to another set of guide rolls 70b, 40 of a guide roll system. Guide rolls 70b, 40 guide the core member 38 and the applied outer armor wire casing 29 to the take-up reel 42. Feed rollers 27 provide the force to drive the completed wrapped cable to the take-up reel 42. The take-up reel 42 has its rotational axis aligned with the longitudinal axis of the core member 38.

The guide rolls 22a, 22b at the payoff reel 20 and the guide rolls 70b, 40 at the take-up reel 42 rotate with the central core member 38 about its longitudinal axis between the guide rolls 22b and 70b. The outer armor encasement wire 29 (shown schematically in FIG. 8) is applied to the continuously moving and continuously rotating central core member 38 at the wire coiling/wrapping point 30. The result is an armored communication cable featuring a high lay angle of the outer armor wire being wound on the take-up reel 42.

Figure 8:
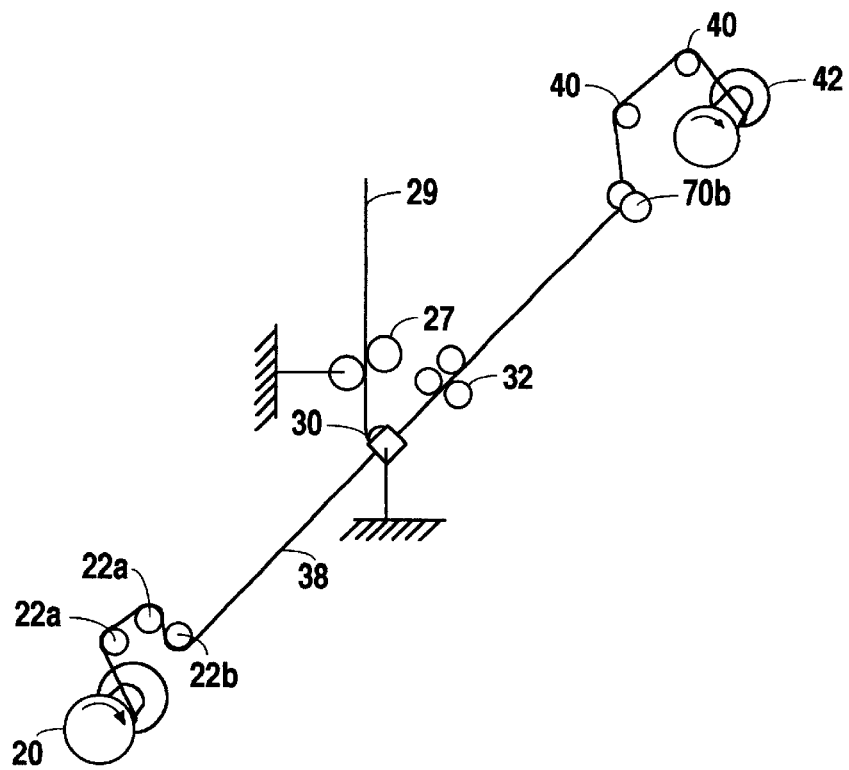
FIG. 8 is a schematic diagram of the manufacturing process for the long, flexible, armored communication cable of the present invention.
Figure 8A:
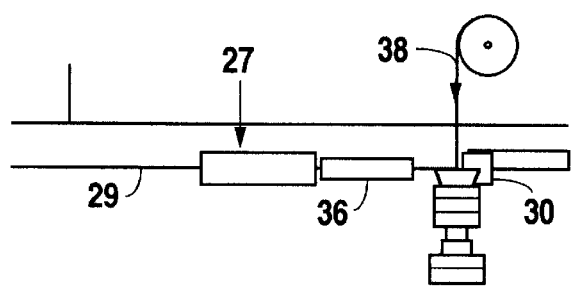
FIGS. 8A and 8B are a top plan view respectively and a front elevational view of a schematic representation of the wrapping of the armor wire around the central core member.
Figure 8B:
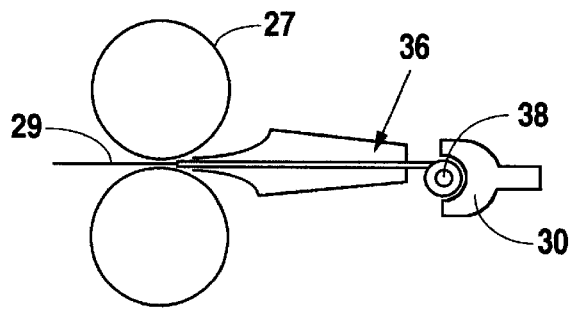

In FIGS. 8A and 8B it may be seen that the armor wire 29 is driven by the feed rollers 27 to the coiling/wrapping point 30. A wire guide 36 places the armor wire 29 at the right location to enter the coiling/wrapping point 30. Thus, just as the armor wire 29 is coiled, the central core member 38 is fed into the coiled armor wire 29. Because the linear feed of the armor wire 29 matches the rotational speed of the central core member 38, the central core member 38 and the coiled armor wire 29 rotate together as the wrapped cable leaves the coiling/wrapping points. As previously indicated, for smaller diameter armored cable, the central core member does not rotate and the feed rollers 27 and the coiling/wrapping point 30 spin around the non-rotating central core member 38 as it moves linearly forward. In the manufacturing process for either the large diameter armored cable where the central core member 38 rotates or in the manufacturing process for the small diameter armored cable where the central core member 38 does not rotate, a small space is left between the individual wraps of armor wire 29. It is this small space which provides sufficient flexibility to the long, flexible armored communication cable of the present invention to enable its coiling and ease of use.

Figure 9:
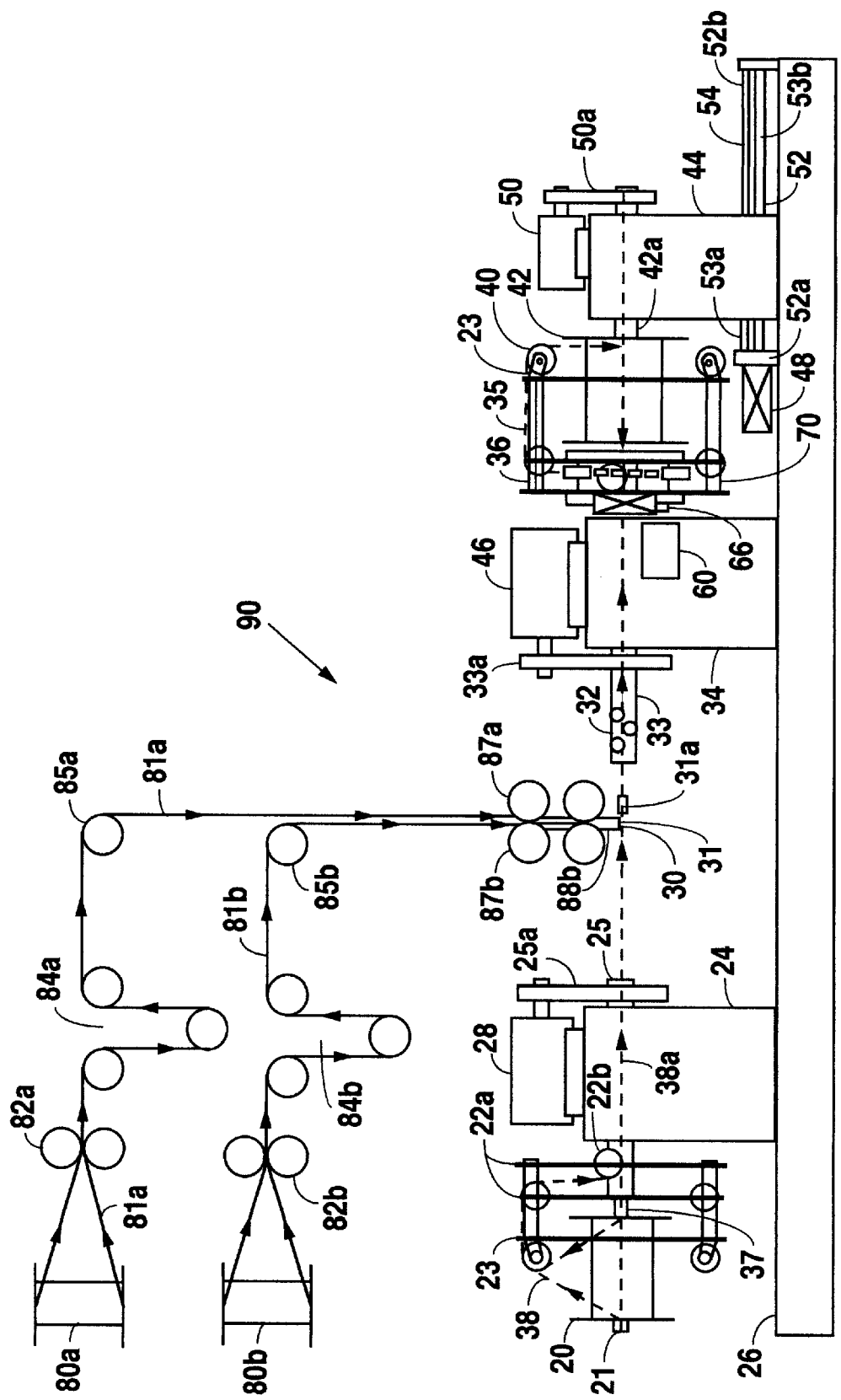
FIG. 9 is a schematic side elevational view of the manufacturing apparatus of the present invention.
Figure 10:
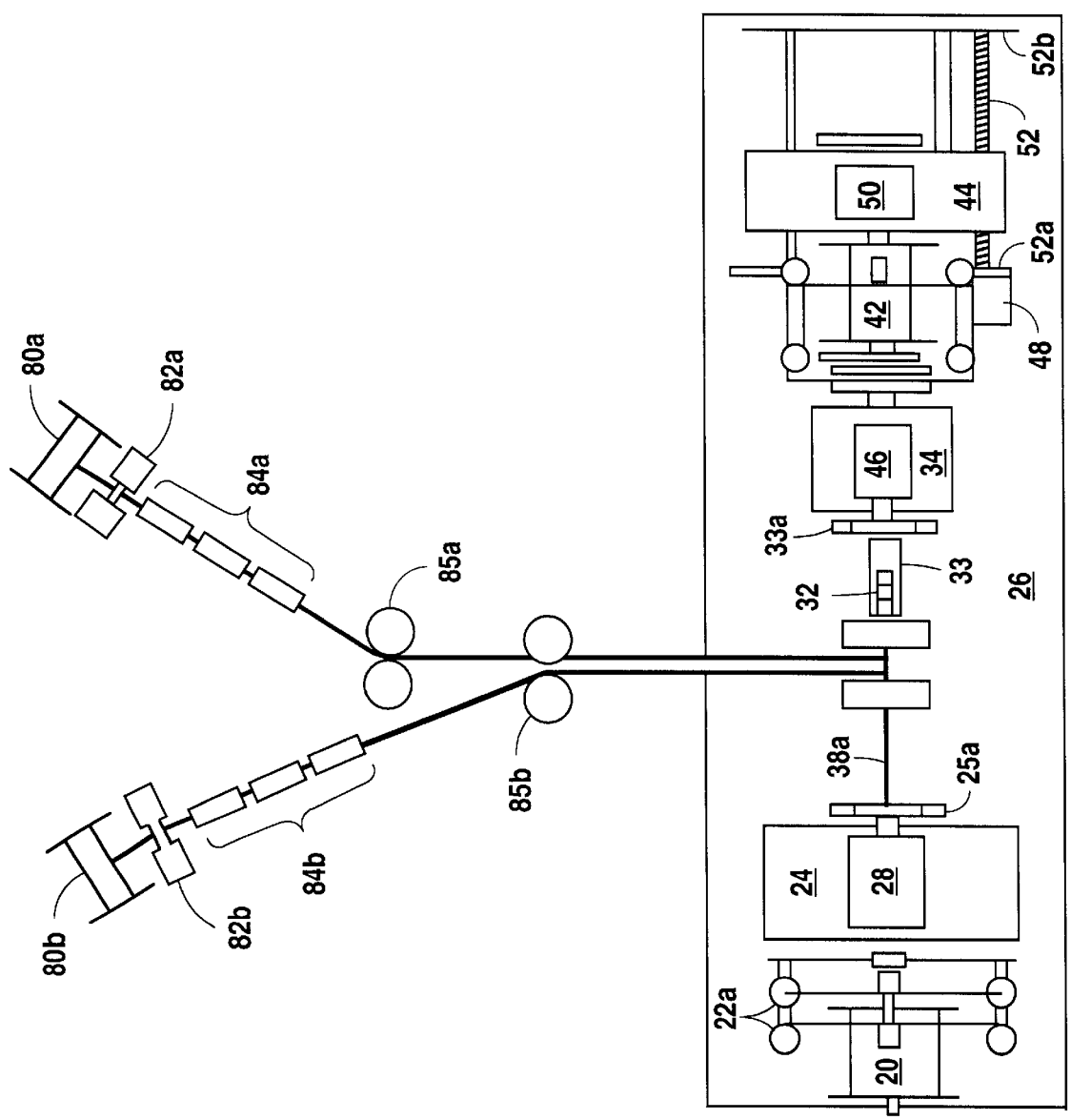
FIG. 10 is a schematic top view of the manufacturing apparatus of the present invention.

Referring now to FIGS. 9 and 10, the manufacturing apparatus 9 for the long, flexible, armored communication cable of the present invention is illustrated schematically. The manufacturing apparatus 9 has spaced apart vertical frame members 24, 34. The spaced apart vertical frame members 24, 34 are fixed and mounted on a longitudinally extending main base frame 26. The vertical frame member 24 has a drive motor 28 mounted on it which drives or rotates a tubular payoff shaft 25 by means of a belt 25a. The tubular payoff shaft 25 is mounted on the frame member 24 by rotational ball bearings (not shown) and rotates about center line 38a. The tubular payoff shaft 25 extends outwardly away from the vertical frame member 24 and is attached by a slip clutch 37 to a reel shaft 21 which supports the payoff reel 20. The reel shaft 21 is supported for rotation in a suitable manner on the main base frame 26. The payoff reel 20 contains the central core member 38 which is pre-wrapped or spooled on the payoff reel 20. The central core member 38 is preferably either a single wire member or a bundle of wires covered by an outer cover (see reference numbers 7, 8, 16, and 19 above for typical central core members).

Figure 11:
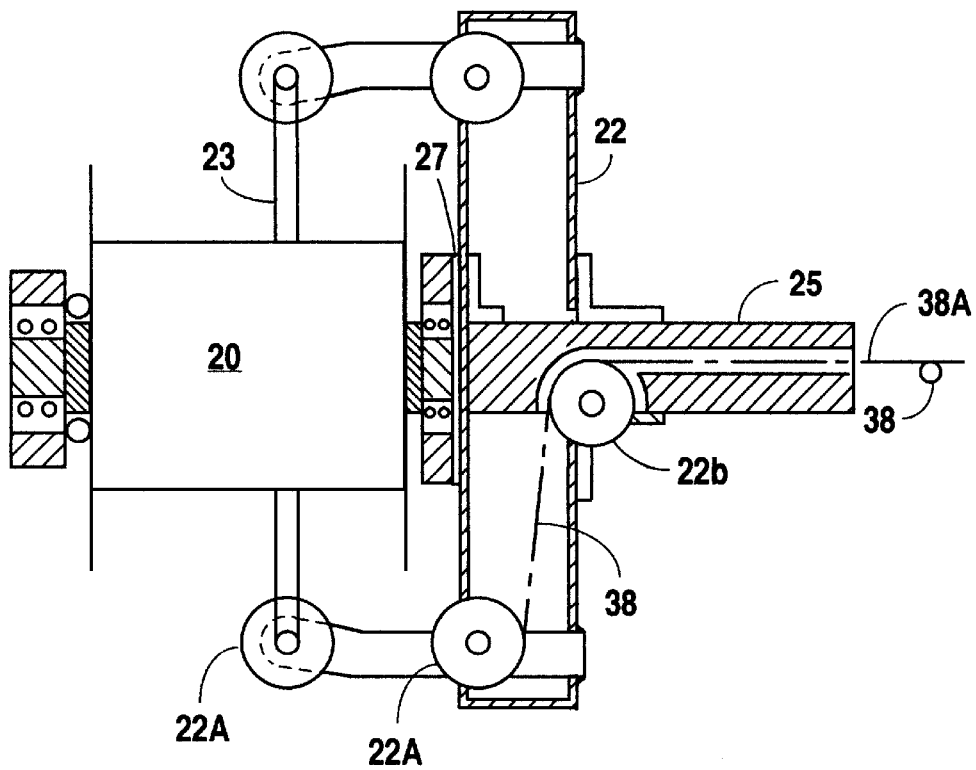
FIG. 11 is a side elevational view, in partial section, of the payout reel section of the apparatus.
Figure 12:
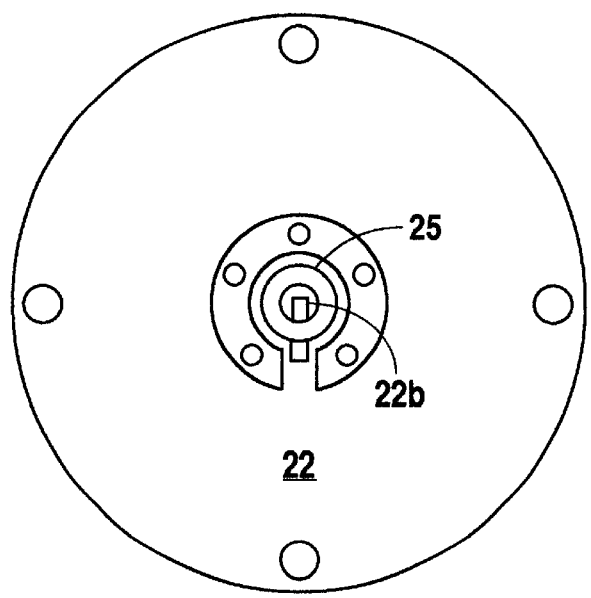
FIG. 12 is a left side elevational view of the manufacturing apparatus show in FIG. 9.
Figure 13:
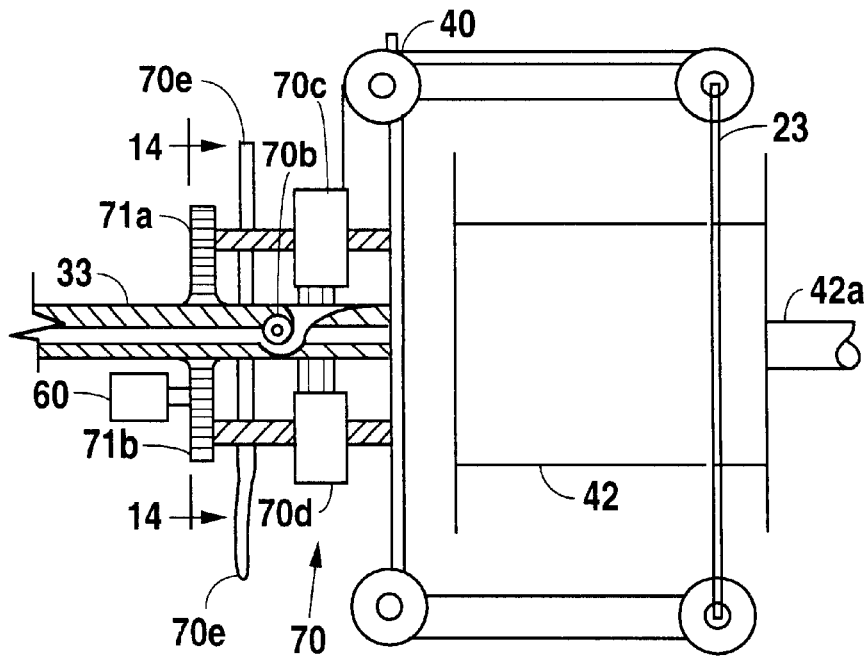
FIG. 13 is an elevational view of the take-up capstan assembly.

As shown in FIGS. 11 and 12, a payout flyer 22, which can be a cylindrical structure, is mounted on or attached to the tubular payoff shaft 25. The payout flyer 22 has circumferentially located sets of diametrically arranged guide rolls 22a. A guide roll 22b is located in a slot in the tubular payoff shaft 25 relative to the center line of the shaft 25 so that the central core member 38 is supplied from the payoff reel 20 over the guide rollers 20a to the guide roll 22b. The guide roll 22b aligns the central core member 38 with the center line of the shaft 25. As shown in FIGS. 9, 11 and 13, a stiffening ring 23 is attached to the payout flyer assembly 22 and take-up flyer assembly 70e.

In the take-up frame member 34, an independent main motor 46 is mounted on the take-up frame member 34 and drives or rotates a tubular main shaft 33 by means of a belt or chain drive 33a. The tubular main shaft 33 is mounted on the take-up frame member 34 by ball bearings (not shown) for rotation about its center line, which is the same as the center line 38a. The center line of the main shaft 33 is aligned with the center line of the payoff shaft 25. Mounted on the main shaft 33 is a tension sensor assembly 32 which is aligned with the central axis of the main shaft 33 and the payoff shaft 25. The tension sensor assembly 32 consists of three rollers. The mid roller of the three rollers in the tension sensor assembly 32 is offset slightly with respect to the center line so that the rollers sense the tension of the completed flexible, armored communication cable between the payoff reel 20 and the take-up capstan assembly 70.

Figure 14:
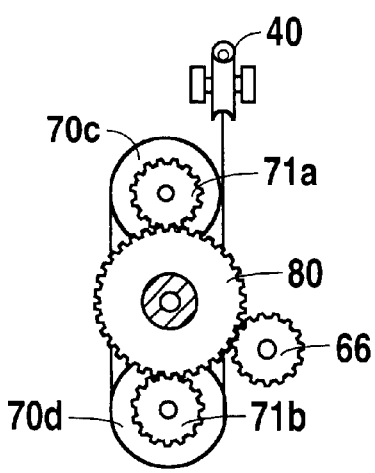
FIG. 14 is an elevational view taken at line 14—14 of FIG. 13.

As shown in FIGS. 13 and 14, the flexible, armored communication cable is supplied to the take-up capstan assembly 70 through a bore in the shaft 33 and a guide roller 70b in the shaft 33 to a first capstan guide roll 70c and thence to a second capstan guide roll 70d. The completed cable is wound over the grooves in both the capstan guide rolls 70c and 70d and then passed to the guide rolls 40 and then to the take up reel 42. The take-up capstan guide rolls 70c and 70d are rotatably mounted on a take-up flyer assembly 70e. As shown in FIG. 14, the two take-up capstan guide rolls 70c and 70d include gears 71a, 71b which are driven by a driver gear 66 and an idler gear 80. The driver gear 66 is driven by a motor 60 which is mounted on the frame member 34. Bearings support the main shaft 33 and the idler gear 80 so that the idler gear 80 rotates at a rate or speed independent of the rotation rate or speed of the main motor 46. The rotational speed of the take-up capstan assembly 70 must be sufficient to keep up with the rotational speed of the main shaft 33 plus an amount necessary to drive the capstan sufficiently to pull the completed cable through the tension sensor assembly 32. The take-up flyer assembly 70e is supported by the take-up frame member 34 and is driven by the main drive motor 46.

The take-up reel 42 is rotatably mounted on a central shaft 42a which is mounted on a traveling frame 44. The central shaft 42a is driven by a take-up motor 50 through a chain or belt drive 50a. The traveling frame 44 is slidably mounted on parallel slides 54 on the base member 26 to move longitudinally in a direction parallel to the longitudinal axis of the central core member 38. The traveling frame 44 is attached to a lead screw 52 which is driven by a motor 48. The lead screw 52 is threadedly attached to the traveling frame 44 and causes the traveling frame 44 to travel back and forth between end stops 52a, 52b. At the end of each longitudinal traverse of the traveling frame 44, the traveling frame 44 engages an adjustable limit switch 53a or 53b which causes the motor 48 to reverse directions. Thus, the take-up reel 42 is rotated about an axis 38a and moved through a traverse motion to wind the finished product on the take-up reel 42.

As can be appreciated from the foregoing description, the central core member 38 is routed from a payoff reel 20 and rotated about the longitudinal axis of the segment of the central core member 38 located between the payoff stand 24 and the take-up stand 34 and is applied to the take-up reel 42. Thus, the central core member 38 is not twisted between the payoff reel 20 and the take-up reel 42.

Armor wire for the outer protective cover over the central core member 38 is supplied from payoff reels 80a, 80b. Two wire supplies 80a, 80b are illustrated for the application of side by side wire elements around the central core member 38. It will be appreciated by those of ordinary skill in the art that a single outer armor wire can also be used. Armor wire 81a can be fed through flattening rolls 82a (although round wire can also be applied). The armor wire 81a is fed from the rolls 82a to a dancer mechanism 84a to guide pulley 85a. The armor wire is supplied through one or more sets of feed rollers 87a, 87b to a guide tube and thence to a coiling/wrapping point 31. If two armor wires are to be wrapped around the central core member 38, two separate coiling/wrapping points may be used, one for each armor wire, or a single coiling/wrapping point may be used to coil both armor wires.

At the same time, the second wire 81b is fed through the flattening rolls 82b, a dancer mechanism 84b, guide pulley 85b, feed rollers 87b and a guide tube 88b to the coiling point 30. The wires 81a and 81b are wound at the coiling/wrapping points around the rotating central core member 38. The central core member 38 is not used as a mandrel for the coiling of the outer, flattened armor wire 81a and 81b. Rather, the outer, flattened armor wire 81a and 81b is formed into a coil shape at the same time it is wrapped around the central core member 38. This forming of the armor wire before it is wrapped around the central core member, or preforming the armor wire, is necessary due to the high yield forces required to form armor wire with sufficient cross-sectional area to provide the needed crush resistance. As complete coverage of the central core member 38 by outer armor wire 81a and 81b is desired but for the small spaces between the individual wraps to provide flexibility, the winding operation results in very steep lay angles from about 60° to nearly 90° as measured from the center line of the product. From one or more coiling/wrapping points, the completed rotating long, flexible, armored communication cable moves through a spring loaded split nut or former 31a to enable cutting at the exact helix angle of the wire wrap of the cable. The split nut 31a which is non-rotating and is fixed to the frame forms a point of separation to prevent the take-up reel 42 from pulling on or affecting the one or more coiling/wrapping points where the flattened armor wires 81a and 81b are wrapped around the central core member 38.

When a compressible cover is used on the central core member, the flattened armor wire 81a and 81b is wound tight enough around the compressible outer cover of the central core member 38 to compress the outer cover 10, 13. It has been found that after the wrapping process is completed, the coiled, flattened, armor wire 81a and 81b expands slightly in diameter or relaxes. The tightness of the wrap of the flattened armor wire 81a and 81b about the central core member 38 should be such that after the coiled, flattened, armor wire 81a and 81b expands, it will still compress the outer cover of the central core member 38. This compression of the compressible outer cover assures that the central core member 38 is captured by the coiled armor wire 81a and 81b. As shown in FIGS. 5 and 5A, the compressible cover of the central core member may include a plurality of ribs 17 or protuberances 18. The compression of these ribs 17 or protuberances 1817 will hold the central core member in position with respect to the outer armor wrap.

As previously indicated, the outer armor wrap may be glued to the outside of the central core member or dings or indentations 9 may be placed at predetermined locations in the armor wrap to cause interference contact between the armor wrap and the outside of the central core member.

Lubrication and cooling can be provided at the coiling points 30, 31 and the split nut 31A as required.

Utilization

Figure 15:
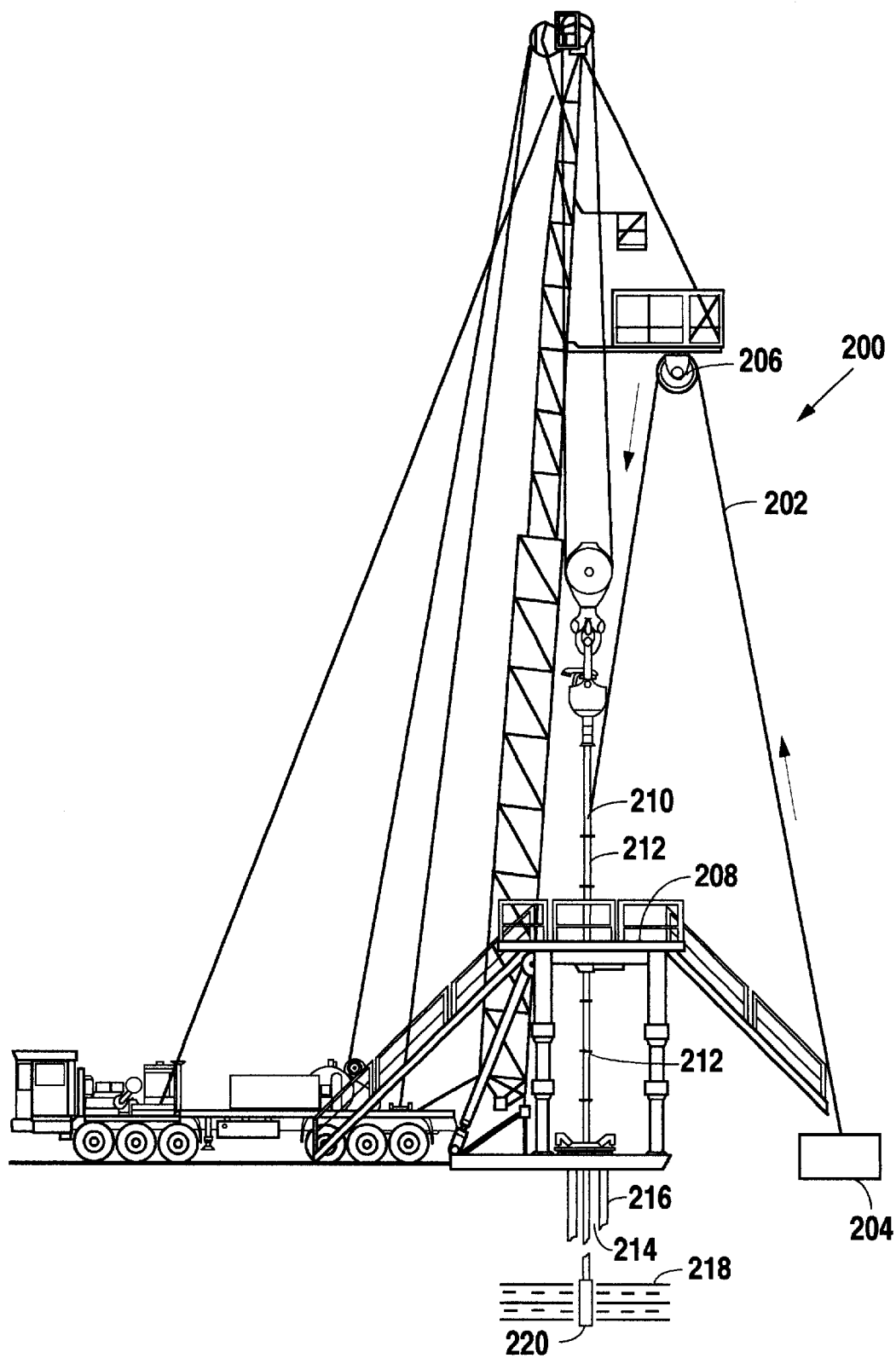
FIG. 15 is an elevational view of a typical rig over an oil or gas well.

As may be seen in FIG. 15 the long, flexible, armored cable 202 of the present invention is used with a string of production tubing 210 associated with a rig assembly 200 over a well 214. A well operator will receive a coil of wire in a container 204, which may be as simple as a cardboard box or on a rotatable storage reel. Instrumentation modules such as those shown in FIG. 16 may be packaged with the coiled cable 202. As the cable 202 in the container 204 exits the container 204, which container 204 need not be rotated in any way, the cable 202 passes over a pulley 206, then the cable 202 travels to a position where it is attached 212 to the sections of production tubing 210 before passing through the rig floor 208 and into the well 214 inside or outside the casing walls 216. Because the long, flexible, armored communication cable 202 of the present invention is flexible, it need not be straightened like tube wire before being attached 212 to the production tubing string 210. Additionally, the cable 202 of the present invention may be bent numerous times without risking the problem of cold working the outer armor wire. If desired the cable 202 may run the entire length of the production string 210 to the screens or other apparatus 220 at the bottom of the production string 210 through which oil or gas from the formation 218 passes into the production string 210.

As shown in FIG. 16, a small section of the armor wire 11 may be removed in a central portion of or at the end of the long, flexible, armored communication cable to expose the central core member 38. The wires within the central core member may then be connected to a variety of instruments for measuring physical parameters within a well such as vibrations, noise, pressure, temperature, or radiation. Such instruments may be located at predetermined regular intervals along the cable 202 or at random intervals or at intervals determined by the geology or structure of the formation in which the well is drilled. Protection for the instruments can be provided by embedding the instruments within epoxy or insulation 310 with a metallic or non-metallic casing assembly 300 or over-molding a protective cover. If desired the casing assembly may be split and attached by the use of fasteners within the threaded holes 307.

Formation of the exposed section within the long, flexible, armored communication cable of the present invention is accomplished as shown in FIGS. 17, 17A, and 17B. Specifically, an end mill 400 is run along either side of the cable 202 held by a fixture 408 at a pre-determined location. The end mill 400 removes sufficient material 402 to effectively split the outer armor wire into two sections 404 and 406. Removal of the top section 404 from the bottom section 406 will expose the central core member 38.

While the foregoing invention has been explained according to its use with oil/gas wells, it may be used in a wide variety of applications, each of which require the protection of a central core member. For example, the present invention has particular applicability where rodents frequently chew through insulated wires.

It will be apparent to those skilled in the art that various changes may be made in the invention without departing from the spirit and scope thereof and therefore the invention is not limited by that which is disclosed in the drawings and specification but only as indicated on the appended claims.

What is claimed is:

1. A long, flexible, armored communication cable comprising:
   an elongated central core member including a substantially cylindrical non-metallic compressible outer jacket;
   at least one outer armor wire member, said at least one outer armor wire member including preformed, spaced apart coils; and
   said preformed, spaced apart coils being wrapped around said non-metallic compressible outer jacket to affix the position of said non-metallic compressible outer jacket with respect to said preformed, spaced apart coils to provide crush protection for said elongated central core member;

wherein the ratio of the outer diameter of the long, flexible, armored communication cable to the thickness of said at least one outer armor wire member is between about 4:1 to about 11:1.

2. The long, flexible, armored communication cable as defined in claim 1, wherein said ratio of the outer diameter of the long, flexible, armored communication cable to the thickness of said at least one outer armor wire member is 6.15:1.

3. The long, flexible, armored communication cable as defined in claim 1, wherein said at least one outer armor wire member is flattened before being formed into said preformed coils.

4. The long, flexible, armored communication cable as defined in claim 1, wherein the position of said non-metallic compressible outer jacket is affixed with respect to said preformed, spaced apart coils by compressing said non-metallic compressible outer jacket.

5. The long, flexible, armored communication cable as defined in claim 4, wherein said compression of said non-metallic compressible outer jacket is caused by an interference fit between the inside diameter of said at least one outer armor wire member and the outer diameter of said non-metallic compressible outer jacket.

6. The long, flexible, armored communication cable as defined in claim 1, wherein the position of said non-metallic compressible outer jacket is affixed with respect to said preformed, spaced apart coils by the application of glue between the outside of said non-metallic compressible outer jacket and the inside of said at least one outer armor wire member.

7. The long, flexible, armored communication cable as defined in claim 1, wherein the position of said non-metallic compressible outer jacket is affixed with respect to said preformed, spaced apart coils by forming indentations in said at least one outer armor wire member.

8. A long, flexible, armored communication cable comprising:

an elongated central core member including a substantially cylindrical non-metallic compressible outer jacket;

said elongated central core member including at least one wire;

at least one outer armor wire member, said at least one outer armor wire member including preformed spaced apart coils; and said preformed, spaced apart coils being wrapped around said non-metallic compressible outer jacket to affix the position of said non-metallic compressible outer jacket with respect to said preformed, spaced apart coils to provide crush protection for said elongated central core member;

at least one exposed portion on the long, flexible, armored communication cable formed by removing at least a portion of said at least one outer armor wire member to expose said elongated central core member;

means for sensing a physical parameter such as vibration, noise, pressure, liquid level, temperature, or radiation connected to said central core member at said at least one exposed portion;

wherein the ratio of the outer diameter of the long, flexible, armored communication cable to the thickness of said at least one outer armor wire member is between about 4:1 to 11:1.

9. The long, flexible, armored communication cable as defined in claim 8, wherein said ratio of the outer diameter of the long, flexible, armored communication cable to the thickness of said at least one outer armor wire is 6.15:1.

10. The long, flexible, armored communication cable as defined in claim 8, wherein said at least one outer armor wire member is flattened before being formed into said preformed coils.

11. The long, flexible, armored communication cable as defined in claim 8, wherein the position of said non-metallic outer jacket is affixed with respect to preformed, spaced apart coils by compressing said non-metallic compressible outer jacket.

12. The long, flexible, armored communication able as defined in claim 11, wherein said compression of said non-metallic compressible outer jacket is caused by an interference fit between the inside diameter of said at least one outer armor wire member and the outer diameter of said non-metallic compressible outer jacket.

13. The long, flexible, armored communication cable as defined in claim 8, wherein the position of said non-metallic compressible outer jacket is affixed with respect to said preformed, spaced apart coils by the application of glue between the outside of said non-metallic compressible outer jacket and the inside of said at least one outer armor wire member.

14. The long, flexible, armored communication cable as defined in claim 8, wherein the position of said non-metallic compressible outer jacket is affixed with respect to said preformed, spaced apart coils by forming indentations in said at least one outer armor wire member.

* * * * *